United States Patent
Teufel et al.

(10) Patent No.: US 7,883,134 B2
(45) Date of Patent: Feb. 8, 2011

(54) VEHICLE SEAT, PARTICULARLY MOTOR VEHICLE SEAT

(75) Inventors: Ingo Teufel, Rockenhausen (DE); Kai Schumann, Rieschweiler (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 192 days.

(21) Appl. No.: 12/307,297

(22) PCT Filed: Jan. 26, 2008

(86) PCT No.: PCT/EP2008/000608

§ 371 (c)(1),
(2), (4) Date: Jan. 2, 2009

(87) PCT Pub. No.: WO2008/104255

PCT Pub. Date: Sep. 4, 2008

(65) Prior Publication Data

US 2009/0309383 A1     Dec. 17, 2009

(30) Foreign Application Priority Data

Mar. 1, 2007   (DE) ................... 10 2007 010 975

(51) Int. Cl.
    B60N 2/02       (2006.01)
(52) U.S. Cl. .................................. 296/65.05
(58) Field of Classification Search ............. 296/63, 296/65.05, 65.06, 65.011, 65.13, 65.16, 65.11; 248/421, 419, 420; 297/344.17, 344.15, 297/216.15, 216.16, 216.17, 216.18, 216.1
    See application file for complete search history.

(56) References Cited

U.S. PATENT DOCUMENTS 6,851,753 B2    2/2005   Akaike et al.

FOREIGN PATENT DOCUMENTS

| DE | 196 16 070 | 11/1997 |
|---|---|---|
| DE | 100 59 150 | 6/2001 |
| DE | 103 55 819 | 6/2005 |
| DE | 10 2005 020 33 | 8/2006 |
| JP | 2005 067325 | 3/2005 |
| WO | WO 03/033296 | 4/2003 |
| WO | WO 2004/043730 | 5/2004 |

*Primary Examiner*—Lori L Lyjak
(74) *Attorney, Agent, or Firm*—McGlew & Tuttle, P.C.

(57) ABSTRACT

In a vehicle seat (1), particularly a motor vehicle seat, having at least one bottom rail (21) to be connected to the vehicle chassis (S), at least one upper rail (22) displaceable in the seat longitudinal direction relative to the bottom rail (21) for the seat longitudinal adjustment, at least one fitting base (17), which is attached at least on the upper rail (22), and one backrest structure (14), which is attached by at least one fitting (15) in a manner that is pivotable about a backrest pivoting axis (C), the fitting base (17) is hinged on the upper rail (22) by a joint (E).

14 Claims, 1 Drawing Sheet

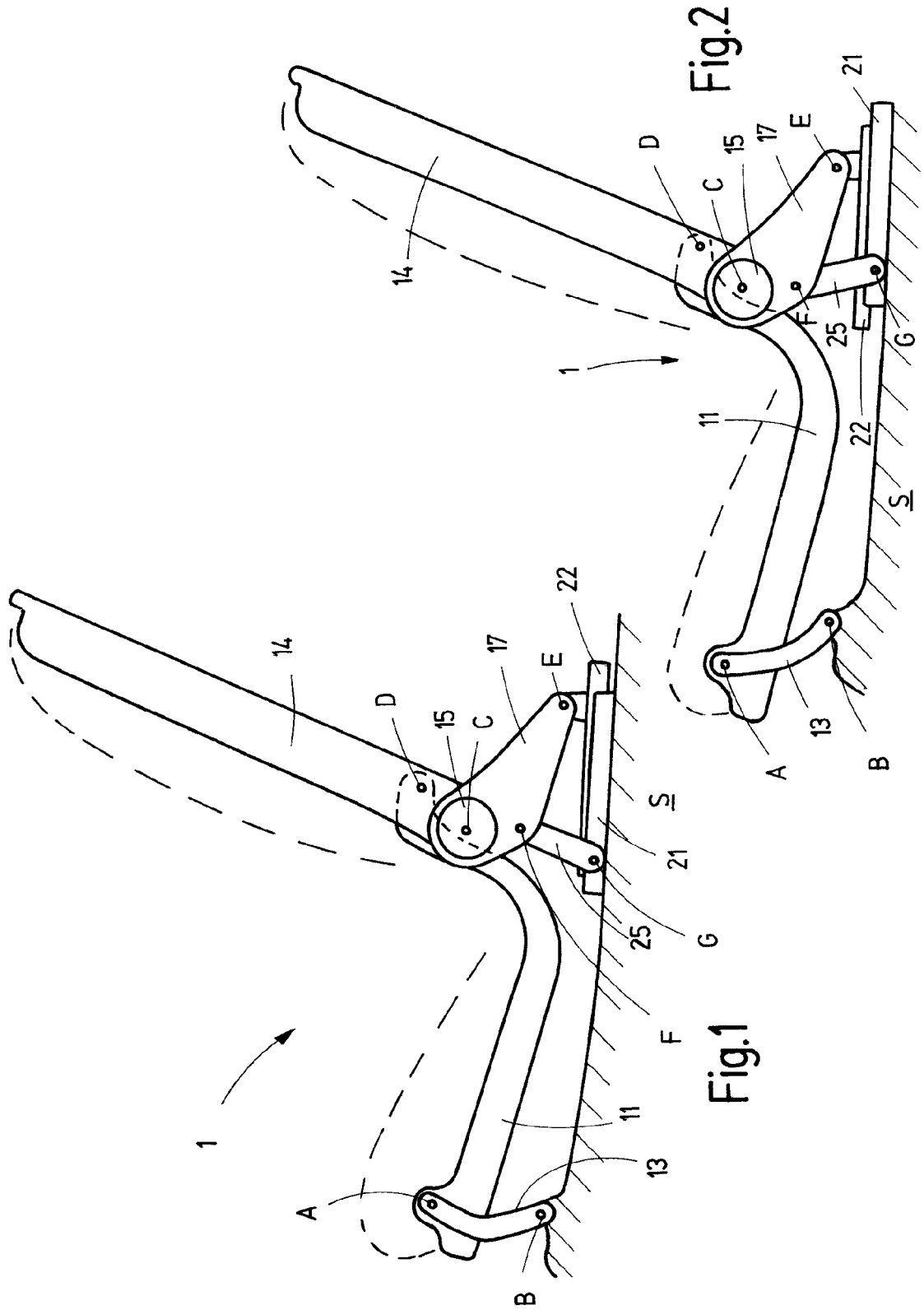

US 7,883,134 B2

VEHICLE SEAT, PARTICULARLY MOTOR VEHICLE SEAT

CROSS REFERENCE TO RELATED APPLICATIONS

This application is a United States National Phase application of International Application PCT/EP2008/000608 and claims the benefit of priority under 35 U.S.C. §119 of German Patent Application DE 10 2007 010 975.1 filed Mar. 1, 2007, the entire contents of which are incorporated herein by reference.

FIELD OF THE INVENTION

The present invention pertains to a vehicle seat, particularly a motor vehicle seat.

BACKGROUND OF THE INVENTION

In a vehicle seat of this type known from use, the fitting lower part is attached to the upper rail by means of two formed feet. In the event of a crash, torques occur in this region which subject the upper rail to a load. In particular, in the extreme positions in the longitudinal direction of the seat, i.e. fully forwards and fully back, these crash torques may cause the risk that at one end the upper rail begins to separate from the lower rail as a result of material deformations.

SUMMARY OF THE INVENTION

An object of the invention is to improve further a vehicle seat of the aforementioned type.

As the fitting lower part is articulated by means of a joint to the upper rail, in the event of a crash, torques may not be transmitted to the upper rail but only forces in the longitudinal direction of the seat or in the vertical direction which, however, intensify the bearing forces. In order to absorb these increased bearing forces, it is advantageous if the joint is arranged above rolling elements and/or a lock, provided between the lower rail and upper rail.

The prevention of torque transmission may be improved by the fitting lower part being articulated by means of a guide rod to the lower rail, so that additionally no torques may be transmitted to the lower rail. The guide rod provides the necessary longitudinal compensation during the relative displacement of the lower rail and the upper rail.

The vehicle seat preferably has a seat frame which at its front end is articulated to at least one rocker. As a particularity, the rocker is not articulated with its other end to the upper rail but articulated to the vehicle structure by means of a joint arranged fixed to the vehicle structure. In this case, the rocker may be directly articulated to the vehicle structure by means of this joint arranged fixed to the vehicle structure, for example to a bearing block or foot or the like, fixed to the vehicle structure. This variant is preferable. The rocker may, however, also be articulated indirectly to the vehicle structure, for example by the rocker being articulated to an intermediate structure of further gear members which in turn is articulated to the vehicle structure.

The seat frame is preferably articulated at its rear end to the backrest structure. With a longitudinal adjustment of the vehicle seat, the upper rails provided at the rear end of the vehicle seat are displaced relative to the associated lower rails, fixed to the vehicle structure, whilst the rockers provided at the front end pivot about the associated joints arranged fixed to the vehicle structure. As a result, the seat frame is moved as a whole in the longitudinal direction of the seat. The spacing between the joint of a rocker arranged fixed to the vehicle structure and the associated lower rail fixed to the vehicle structure remains constant.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective side view of the embodiment in a rear longitudinal position of the seat, with upholstery indicated in broken lines; and FIG. 2 is a perspective side view corresponding to FIG. 1 in a front longitudinal position of the seat.

DESCRIPTION OF THE PREFERRED EMBODIMENTS

Referring to the drawings in particular, a vehicle seat 1, for example for a rear seat row of a motor vehicle, is connected to the vehicle structure S of the motor vehicle. The arrangement of the vehicle seat 1 within the motor vehicle and the usual direction of travel thereof define the directional information subsequently used. The vehicle seat 1 comprises a seat frame 11 which at its front end is articulated on both vehicle seat sides by means of one respective rocker 13 to the vehicle structure S. Preferably, to this end, a bearing block or foot or the like is fastened to the vehicle structure S. The first joint defined by the articulation of the rocker 13 to the seat frame 11 is denoted by A, the second joint defined by the articulation of the rocker 13 to the vehicle structure is denoted by B. The second joint B is arranged fixed to the vehicle structure.

The vehicle seat 1 further comprises a backrest structure 14 which is attached on both vehicle seat sides by means of fittings 15 to fitting lower parts 17. In this case, the backrest structure 14 is pivotable relative to the fitting lower parts 17 about a backrest pivot axis C by means of fittings 15, when they are unlocked (in the case of an embodiment as detent fittings) or are driven (in the case of an embodiment as geared fittings). In the present case, the seat frame 11 is articulated to the backrest structure 14 with the ends of its side parts, by means of one respective third joint D on both vehicle seat sides. The third joint D is spaced apart from the backrest pivot axis C. The backrest structure 14 and the seat frame 11 are provided with cushions in a manner known per se.

The vehicle seat 1 comprises on both vehicle seat sides two seat rails, in the present case a lower rail 21 fastened to the vehicle structure S (i.e. fixed to the vehicle structure) and an upper rail 22 which is displaceable thereto and may be locked thereto. In the present case, the lower rail 21 and the upper rail 22 extend in the longitudinal direction of the seat only over a small region at the rear end of the vehicle seat 1.

The fitting lower part 17 is articulated at its rear end by means of a fourth joint E to the upper rail 22, for example approximately centrally and/or above the rolling elements conventionally provided between the lower rail 21 and the upper rail 22, and/or above the lock between the lower rail 21 and the upper rail 22. The fitting lower part 17 is articulated at its front end by means of a fifth joint F to a guide rod 25 which in turn is articulated by means of a sixth joint G to the lower rail 21.

For a longitudinal seat adjustment, i.e. for the adjustment of the position of the vehicle seat 1 in the longitudinal direction of the seat, the upper rails 22 are unlocked and displaced relative to the lower rails 21. By means of the fourth joint E, the sixth joint G and the fifth joint F a triangle is respectively defined which alters its shape during the longitudinal adjustment of the seat and thus displaces the respective fitting lower part 17 to the front or to the rear. As the fittings 15 remain locked and/or are not driven, the backrest structure 14 is also respectively displaced in the longitudinal direction of the seat to the front or to the rear with the fitting lower parts 17. By means of the first joint A, the second joint B, the sixth joint G, the fifth joint F and the third joint D, a five-bar mechanism is respectively defined which also alters its shape during the longitudinal adjustment of the seat. In this case, preferably the seat frame 11 is displaced to the front or to the rear in the longitudinal direction of the seat. The rockers 13 pivot accordingly about the second joints B. With the longitudinal adjustment of the seat of the vehicle seat 1 and as a result of these movements of the multiple joints, the height of the seat frame 11 and the backrest structure 14 over the vehicle structure S is generally also altered, as well as the inclination of the seat frame 11 relative to the vehicle structure S. These movements are dependent on the ratio of the longitudinal adjustment path to the length of the rockers 13 and guide rods 25 and on the initial angular position of the rockers 13 and the guide rods 25.

For adjusting the inclination of the backrest, the fittings 15 are unlocked and/or driven, whereby the backrest structure 14 is pivotable about the backrest pivot axis C. By means of the first joint A, the second joint B, the backrest pivot axis C and the third joint D, a four-bar linkage is defined which alters its shape during the adjustment of the inclination of the backrest. In this case, the seat frame 11 is displaced in the longitudinal direction of the seat slightly to the front or to the rear, and generally at the same time altered in its height and inclination relative to the vehicle structure S to a markedly lesser extent.

The vehicle seat 1 may also adopt a planar position of non-use, by the backrest structure 14 being pivoted to the front onto the seat frame 11, beyond the region of adjustment of the inclination of the backrest, until it adopts an approximately horizontal position. In this case, the aforementioned four-bar linkage lowers the seat frame 11 downward during the pivoting forward of the backrest structure 14.

In the event of a crash, forces are introduced via the backrest structure 14 and the fittings 15 into the fitting lower parts 17. As the fitting lower parts 17 are attached in an articulated manner to the lower rails 21 and upper rails 22, no torques may be transmitted, but only forces in the longitudinal direction of the seat and in the vertical direction. Thus the lower rails 21 and upper rails 22 are prevented from separating from one another, i.e. a deformation and moving apart of the profiles from one end of the rail, in particular when the vehicle seat 1 is located in the frontmost and rearmost longitudinal position of the seat.

While specific embodiments of the invention have been shown and described in detail to illustrate the application of the principles of the invention, it will be understood that the invention may be embodied otherwise without departing from such principles.

The invention claimed is:

1. A vehicle seat, particularly a motor vehicle seat, comprising:
   a lower rail for connection to a vehicle structure;
   an upper rail mounted for movement such that said upper rail is movable relative to said lower rail in a longitudinal direction of the seat for a longitudinal adjustment of the seat;
   a fitting lower part attached at least to said upper rail, said fitting lower part being articulated to said lower rail via a guide rod;
   a fitting;
   a backrest structure attached pivotably to said fitting lower part via at least one said fitting such that said backrest structure pivots about a backrest pivot axis, said fitting lower part being articulated to said upper rail via a first joint;
   a seat frame having a front end portion and a rear end portion; and
   a rocker, said front end portion of said seat frame being directly or indirectly articulated to the vehicle structure via at least one said rocker, said rear end portion of said seat frame being articulated to said backrest structure, wherein:
   a second joint is defined between said seat frame and said rocker;
   a third joint is defined between said rocker and the vehicle structure; and
   a fourth joint is defined between said seat frame and said backrest structure, said second joint, said third joint, said fourth joint and said backrest pivot axis defining a four-bar linkage.

2. A vehicle seat as claimed in claim 1, wherein said first joint is arranged at a position above one or more of a plurality of rolling elements and a lock, said one or more of said rolling elements and said lock being provided between said lower rail and said upper rail.

3. A vehicle seat as claimed in claim 1, wherein said backrest structure is pivotable from a first position to a second position via said fitting such that an inclination of said backrest structure changes when said backrest structure pivots from said first position to said second position, wherein a shape of said four-bar linkage changes when said backrest structure pivots from said first position to said second position.

4. A vehicle seat as claimed in claim 1, wherein:
   said first joint is defined between said fitting lower part and said upper rail;
   a fifth joint is defined between said fitting lower part and said guide rod; and
   a sixth joint is defined between said guide rod and said lower rail, said first joint, said fifth joint and said sixth joint defining a triangle, wherein said first joint, said fifth joint and said sixth joint are movable such that a shape of said triangle changes during the longitudinal adjustment of the seat, said fitting lower part being displaced in one of a forward direction and a rearward direction via said guide rod and said second rail during said longitudinal adjustment of the seat, said forward direction extending in a direction of said longitudinal direction of the seat, said rearward direction being opposite said forward direction.

5. A vehicle seat as claimed in claim 4, wherein said second joint, said third joint, said sixth joint, said fifth joint and said fourth joint define a five-bar linkage, wherein a shape of said five-bar linkage is changed during the longitudinal adjustment of the seat and said five-bar linkage displaces the seat frame in one of said forward direction and said rearward direction.

6. A vehicle seat as claimed in claim 4, wherein said backrest structure is displaced in one of said forward direction and said rearward direction when said fitting lower part is displaced in one of said forward direction and said rearward direction.

7. A vehicle seat as claimed in claim 1, wherein said lower rail, said upper rail, said fitting lower part and said fitting are provided on one side of the vehicle seat and another lower rail, another upper rail, another fitting lower part and another fitting are provided on another side of the vehicle seat.

8. A vehicle seat, comprising:
a vehicle structure;
a first rail connected to said vehicle structure;
a second rail arranged on said first rail such that said second rail is movable relative to said first rail in a longitudinal direction of said first rail, said second rail having a second rail portion;
a connecting part having a first connecting part portion and a second connecting part portion, said first connecting part portion being articulated to said second rail portion such that said first connecting part and said second rail portion define a first joint;
a fitting having a fitting axis;
a backrest structure connected to said second connecting part portion at a first backrest structure location via said fitting such that said backrest structure pivots about said fitting axis;
a seat frame structure for engaging a portion of a passenger, said seat frame structure having a front end seat portion and a rear end seat portion;
a rocker having a first rocker end portion and a second rocker end portion, said first rocker end portion being articulated to a portion of said vehicle structure, said second rocker end portion being articulated to said seat frame structure, said rear end seat portion being articulated to said backrest structure at a second backrest structure location, said second backrest structure location being adjacent to said first backrest structure location, wherein said second rocker end portion and said front end seat portion define a second joint, said first rocker end portion and said portion of said vehicle structure defining a third joint, said rear end seat portion and a portion of said backrest structure defining a fourth joint at said second backrest structure location, said second joint, said third joint, said fourth joint and said fitting defining a four-bar linkage; and
a guide rod, wherein said connecting part is articulated to said first rail via said guide rod.

9. A vehicle seat as claimed in claim 8, wherein one or more of said first rail and said second rail comprises one or more of a plurality of rolling elements and a lock, said one or more of said plurality of rolling elements and said lock being arranged between said first rail and said lower rail.

10. A vehicle seat as claimed in claim 8, wherein said backrest structure is pivotable from a first position to a second position via said fitting such that an inclination of said backrest structure changes when said backrest structure pivots from said first position to said second position, said four-bar linkage moving from a first four-bar linkage position to a second four-bar linkage position when said backrest structure pivots from said first position to said second position.

11. A vehicle seat as claimed in claim 8, wherein:
said second rail portion is located between said second rail and said connecting part;
said guide rod has a first guide rod end portion and a second guide rod end portion, said first guide rod end portion being articulated to a portion of said first rail such that said first guide rod end portion and said portion of said first rail define a fifth joint; and
said connecting part has a third connecting part portion, said second guide rod end portion being articulated to said third connecting part portion such that said second guide rod end portion and said third connecting part portion define a sixth joint, said second rail being movable from a first rail position to a second rail position, said seat frame structure moving in a longitudinal direction from a first seat frame structure position to a second seat frame structure position when said second rail moves from said first rail position to said second rail position, said guide rod moving from a first guide rod position to a second guide rod position when said second rail moves from said first rail position to said second rail position, said connecting part being displaced in one of a forward direction and a rearward direction via said guide rod and said second rail when said second rail moves from said first rail position to said second rail position and said guide rod moves from said first guide rod position to said second guide rod position, said forward direction extending in a direction of said longitudinal direction of said seat frame structure, said rearward direction being opposite said forward direction.

12. A vehicle seat as claimed in claim 11, wherein said second joint, said third joint, said fifth joint, said sixth joint and said fourth joint define a five-bar linkage, said five-bar linkage moving from a first five-bar linkage position to a second five-bar linkage position when said second rail moves from said first rail position to said second rail position and said guide rod moves from said first guide rod position to said second guide rod position, said seat frame structure being displaced in one of said forward direction and said rearward direction when said five-bar linkage moves from said first five-bar linkage position to said second five-bar linkage position.

13. A vehicle seat as claimed in claim 11, wherein said backrest structure is displaced in one of said forward direction and said rearward direction when said second rail moves from said first rail position to said second rail position.

14. A vehicle seat as claimed in claim 8, further comprising:
another first rail;
another second rail;
a second connecting part; and
a second fitting, said first rail, said second rail, said connecting part and said fitting being arranged on one side of the vehicle seat, said another first rail, said another second rail, said second connecting part and said second fitting being arranged on another side of the vehicle seat.

* * * * *